United States Patent [19]

Hatta

[11] 4,337,047
[45] Jun. 29, 1982

[54] TIME COUNTER CONTROLLED ELECTRONIC LEARNING AID

[75] Inventor: Koiti Hatta, Yamatokoriyama, Japan
[73] Assignee: Sharp Kabushiki Kaisha, Osaka, Japan
[21] Appl. No.: 98,026
[22] Filed: Nov. 28, 1979

[30] Foreign Application Priority Data

Nov. 29, 1978 [JP] Japan .......................... 53/164371[U]
Dec. 21, 1978 [JP] Japan .......................... 53/183138[U]

[51] Int. Cl.$^3$ .............................................. G09B 7/00
[52] U.S. Cl. ..................................... 434/201; 434/335
[58] Field of Search ................ 434/201, 202, 362, 335

[56] References Cited

U.S. PATENT DOCUMENTS 3,584,398  6/1971  Meyer et al. ......................... 434/201
3,800,524  4/1974  Matsumura et al. ................... 368/84
4,052,799  10/1977  Journet ................................ 434/362
4,118,876  10/1978  Brilakis ............................... 434/335

*Primary Examiner*—William H. Grieb
*Attorney, Agent, or Firm*—Birch, Stewart, Kolasch & Birch

[57] ABSTRACT

An electronic learning aid automatically develops and displays problems, and functions to compare an answer introduced by a student with a correct answer stored in the electronic learning aid. A time counter is provided for counting a time period required by the student for conducting the exercise. A manual stop switch is provided for terminating the automatic development of the problems and the counting operation of the time counter. Upon actuation of the manual stop switch, the time period stored in the time counter and the number of problems which have been solved are displayed on a display panel. In another form, a preselected time period is stored in a memory, and the automatic problem generation is conducted till the time counter counts up the time period identical with the preselected time period.

11 Claims, 1 Drawing Figure

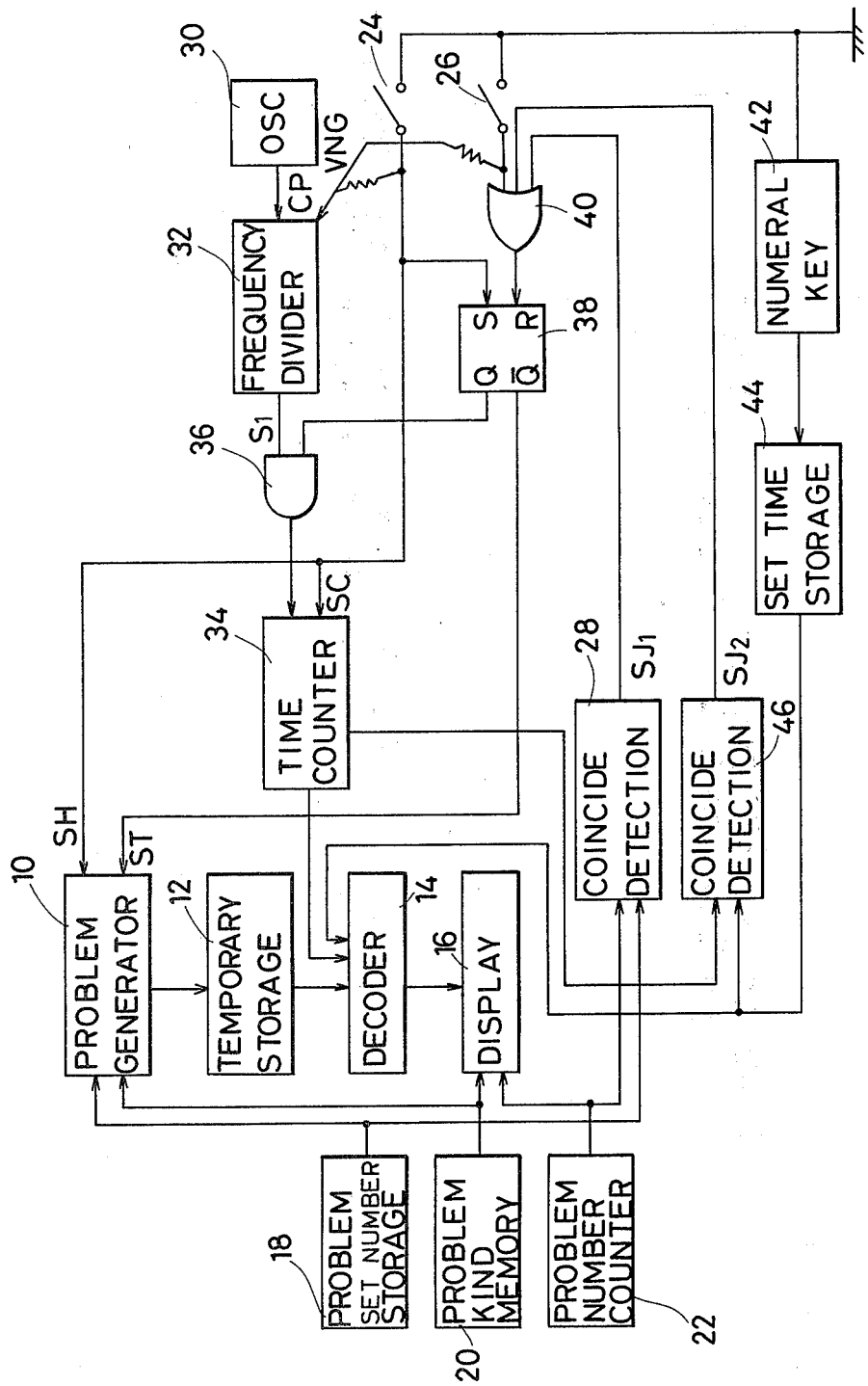

TIME COUNTER CONTROLLED ELECTRONIC LEARNING AID

BACKGROUND AND SUMMARY OF THE INVENTION

The present invention relates to an electronic learning aid and, more particularly, to a time counter in an electronic learning aid for calculating a time period required by a student for solving problems.

An electronic learning aid has been developed, which automatically provides and displays problems of mathematics. Students introduce their answer through key input means after calculation with figures. The electronic learning aid functions to compare the introduced answer with a correct answer stored therein.

A typical construction of a fully electronically controlled learning aid is described in copending application, ELECTRONIC LEARNING AID, Ser. No. 188,865 filed on Sept. 19, 1980, which is a continuation of Ser. No. 952,203, filed on Oct. 17, 1978 and now abandoned by Takashi Sakaue, Koichi Hatta, Megumi Fukusaki and Yoshiro Kataoka, and assigned to the same assignee as the present application.

In a conventional electronic learning aid, a time period required by a student for obtaining the answer is not considered. However, the above-mentioned time period is an important factor for measuring the ability of the student.

Accordingly, an object of the present invention is to provide an electronic learning aid includidng a time period counter for calculating a time period required by a student for solving problems.

Another object of the present invention is to provide an electronic learning aid, wherein problem generation is controlled by a time counter.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a time counter is provided, which initiates its time counting operation upon actuation of start key for instructing the commencement of the automatic problem generation. A problem generation termination key is provided for instructing the termination of the automatic problem generation. The time counter terminates its time counting operation upon actuation of the problem generation termination key. Under these conditions, the time period stored in the time counter, and the problem number having been generated are displayed on a display panel.

In a preferred form, the number of problems to be generated is presettable. The time period counting operation is conducted till the preselected number of problems are generated and answered.

In another preferred form, a storage means is provided for storing a preselected time period during which the generation of problems should be conducted. When the time period counter contents reach the preselected time period, problem generation is terminated and the number of problems which are generated and answered during the preselected time period is displayed on the display panel.

BRIEF DESCRIPTION OF THE DRAWINGS

The present invention will be better understood from the detailed description given hereinbelow and the accompanying drawing which is given by way of illustration only, and thus is not limitative of the present invention and wherein:

The single drawing figure is a block diagram of an embodiment of an electronic learning aid of the present invention.

DESCRIPTION OF THE PREFERRED EMBODIMENTS

The single FIGURE shows an embodiment of an electronic learning aid of the present invention.

The electronic learning aid comprises a problem generator 10 for automatically developing problems, a temporary storage 12 for temporarily storing the problem generated by the problem generator 10, a decoder 14, and a display panel 16 for displaying the problem, an answer introduced by a student, a score, etc. A problem set number storage 18 stores a preselected problem number indicative of the number of problem to be generated in one exercise, a problem kind memory 20 memorizes a selected kind of problem, such as, addition, subtraction, multiplication and division, and a problem number counter 22 counts up the number of problems which have been generated by the problem generator 10.

The above-mentioned elements are described, in detail, in copending applications ELECTRONIC LEARNING AID, Ser. No. 188,865 filed on Sept. 19, 1980 which is a continuation of Ser. No. 952,203, filed on Oct. 17, 1978, and now abandoned by Takashi Sakaue, Koichi Hatta, Megumi Fukusaki and Yoshiro Kataoka, and assigned to the same assignee as the present application and, therefore, the detailed description thereof has been omitted for the purpose of simplicity.

The electronic learning aid further comprises a start key 24 for instructing the initiation of the automatic generation of the problems, a stop key 26 for instructing the termination of the automatic generation of the problems, and a first coincide detection circuit 28 for comparing the contents stored in the problem set number storage 18 and the problem number counter 22 to develop a first detection output $SJ_1$ when the two contents are identical with each other.

The problem generator 10 sequentially develops the problems upon receiving a problem generation instruction signal SH which is developed when the start key 24 is actuated.

An oscillator circuit 30 develops a base clock signal CP of 32,768 Hz which is divided by a frequency divider 32 to obtain a one hertz signal $S_1$. The thus obtained one hertz signal $S_1$ is applied to a time counter 34 through an AND gate 36. The time counter 34 is reset and starts its counting operation when a reset/start signal SC is applied thereto upon actuation of the start key 24.

An R-S flip-flop 38 is provided for controlling the gate operation of the AND gate 36. The flip-flop 38 is set when the start key 24 is actuated, and the set output Q of the flip-flop 38 is applied to the AND gate 36 to make it conductive.

Accordingly, when the start key 24 is actuated, the problem generation instruction signal SH is applied to the problem generator 10 to automatically develop the problems. The thus developed problem is displayed on the display panel 16 through the temporary storage 12 and the decoder 14. At the same time, the AND gate 36 receives the enabling signal from the flip-flop 38 and, therefore, the time counter 34 counts up the one hertz signal $S_1$ derived from the frequency divider 32.

When a predetermined number of problems have been developed as determined by the problem set number storage 18, the first coincide detection circuit 28 develops the first detection output $SJ_1$ which is applied to the reset input terminal of the flip-flop 38 through an OR gate 40. When the flip-flop 38 is reset, the time counter 34 terminates its counting operation because the AND gate 36 becomes nonconductive, and the reset output Q is applied to the problem generator 10 as a problem generation termination instruction signal ST to terminate the automatic problem generation. Under these conditions, the time period stored in the time counter 34 is displayed on the display panel 16 through the decoder 14.

Alternatively, when the stop key 26 is actuated before the problems have been developed by the preselected number, the flip-flop 38 is reset through the OR gate 40. Under these conditions, the time period stored in the time counter 34, and the actually conducted problem number stored in the problem counter 22 are displayed on the display panel 16. The problem number counter 22 counts up when an answer is introduced by a student after generation of the problem.

The electronic learning aid further comprises numeral keys 42 for introducing a preselected time period during which the calculation exercise should be performed. The thus introduced preselected time period is stored in a set time storage 44. A second coincide detection circuit 46 compares the contents stored in the time counter 34 and the set time storage 44 to develop a second detection output $SJ_2$ when the contents stored in the time counter 34 reach the preselected time period stored in the set time storage 44. The second detection output $SJ_2$ is applied to the reset input terminal R of the flip-flop 38 to terminate the automatic problem generation.

Accordingly, when the time period has passed by the preselected time period after actuation of the start key 24, the automatic problem generation is terminated, and the preselected time period stored in the set time storage 44 and the actually performed problem number stored in the problem number counter 22 are displayed on the display panel 16. The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic learning aid wherein problems are automatically developed and displayed on a display panel, a student introduces his answer after calculation with figures, and the introduced answer is compared with a correct answer stored in the electronic learning aid, said electronic learning aid comprisisng:
   time counting means for counting a time period; a start instruction generator for initiating the automatic problem development and the counting operation of said time counting means;
   a stop instruction generator for terminating said automatic problem development and said counting operation of said time counting means; and a first display driver for displaying the contents stored in said time counting means on said display panel.

2. The electronic learning aid of claim 1, wherein said stop instruction generator comprises a manual stop switch for terminating the automatic problem development at a desired time.

3. The electronic learning aid of claim 1 or 2, further comprising:
   a problem number counter for counting the number of problems which have been developed and answered; and a second display driver for displaying the contents stored in said problem number counter on said display panel.

4. The electronic learning aid of claim 3, further comprising:
   problem set number storage means for storing a preselected number by which the problems should be developed; and
   a first coincide detection circuit for comparing the contents stored in said problem number counter and said problem set number storage means, wherein a first detection output of said first coincide detection circuit is applied to said stop instruction generator for activating it.

5. An electronic learning aid comprising:
   means for automatically developing and displaying problems on a display panel;
   means responsive to said means for developing and displaying for generating a correct answer to each of said problems;
   means for introducing a student calculated answer;
   means responsive to said means for generating and said means for introducing for comparing the correct answer with said student calculated answer and for indicating an entered correct answer upon coincidence thereof;
   problem number counter means for counting the total number of problems which have been developed and answered to produce a developed problem number;
   problem set number storage means for storing a number indicative of the desired number of problems to be developed;
   problem number coincidence detection means for comparing the developed problem number generated by said problem number counter means and the desired problem number stored in said problem set number storage means and for producing a stop signal upon coincidence thereof, said stop signal inhibiting the operation of said means for developing and displaying;
   time counting means responsive to said means for automatically developing and displaying for counting the elapsed time during which said problems are being displayed;
   score calculation means responsive to said means for comparing and indicating for determining the relative performance of the student; and
   means responsive to said score calculation means and said time counting means for displaying the time during which said desired number of problems are developed and answered and the relative performance of the student.

6. The learning aid of claim 5 wherein said score calculation means determines the relative performance of the student by calculating the percentage of correct answers from said correct answers produced by said means for comparing and indicating and the developed problem number produced by said problem number counter means.

7. The learning aid of claim 5 wherein said score calculation means determines the relative performance of the student by the total number of correct answers.

8. The learning aid of claim 5 further comprising:
set time storage means for storing the maximum time for problem completion;
time detection means responsive to said set time storage means and said time counting means for comparing the elapsed time generated by said time counting means with the maximum time produced by said set time storage means and for producing said stop signal upon a coincidence thereof.

9. The learning aid of claim 8 wherein said display means further displays the maximum time stored in said set time storage means.

10. The electronic learning aid of claim 5, further comprising:
a manual stop switch for terminating said automatic problem development and said counting operation of said time counting means.

11. The electronic learning aid of claim 5, said time counting means comprising:
an oscillator for developing a base frequency signal;
a frequency divider for developing a one hertz signal from said base frequency signal developed by said oscillator; and
a counter for counting up said one hertz signal developed by said frequency divider.

* * * * *

UNITED STATES PATENT AND TRADEMARK OFFICE
CERTIFICATE OF CORRECTION

PATENT NO. : 4,337,047
DATED : June 29, 1982
INVENTOR(S) : Hatta

It is certified that error appears in the above—identified patent and that said Letters Patent is hereby corrected as shown below:

On the the title page

In the category "[30] Foreign Application Priority Data" change "Nov. 29, 1978 [JP] Japan ..... 53/164371[U]" to --Nov. 29, 1978 [JP] Japan ..... 53/164731[U]--

Signed and Sealed this

Twelfth Day of October 1982

[SEAL]

Attest:

Attesting Officer

GERALD J. MOSSINGHOFF

Commissioner of Patents and Trademarks